United States Patent
Lee et al.

(10) Patent No.: US 9,727,023 B2
(45) Date of Patent: Aug. 8, 2017

(54) APPARATUS AND METHOD FOR GENERATING HOLOGRAM PATTERN

(71) Applicant: Samsung Electronics Co., Ltd., Suwon-si (KR)

(72) Inventors: Seok Lee, Hwaseong-si (KR); Ho Cheon Wey, Seongnam-si (KR); Dong Kyung Nam, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 14/220,640

(22) Filed: Mar. 20, 2014

(65) Prior Publication Data

US 2014/0307298 A1  Oct. 16, 2014

(30) Foreign Application Priority Data

Apr. 15, 2013  (KR) .................. 10-2013-0040822

(51) Int. Cl.
G03H 1/08 (2006.01)

(52) U.S. Cl.
CPC ... G03H 1/0808 (2013.01); *G03H 2001/0825* (2013.01); *G03H 2210/30* (2013.01); *G03H 2210/454* (2013.01)

(58) Field of Classification Search
CPC ............ G03H 1/28; G03H 2001/0022; G03H 2001/0027; G03H 2001/0066; G03H 2001/0212; G03H 2001/0232; G03H 2001/026; G03H 2001/0264; G03H 2001/0268; G03H 2001/0415; G03H 2001/0421; G03H 2001/0426

USPC .......................................................... 359/1–35
See application file for complete search history.

(56) References Cited

U.S. PATENT DOCUMENTS

| | | | |
|---|---|---|---|
| 8,154,781 B2 | 4/2012 | Kroll et al. | |
| 2005/0012757 A1* | 1/2005 | Park | G06T 15/205 345/582 |
| 2008/0057407 A1* | 3/2008 | Kitamura | G03H 1/0808 430/2 |
| 2008/0273032 A1* | 11/2008 | Brennan | G06T 1/60 345/421 |
| 2010/0061444 A1* | 3/2010 | Wilkins | H04N 19/00006 375/240.02 |
| 2011/0096145 A1 | 4/2011 | Schwerdtner | |
| 2011/0310449 A1 | 12/2011 | Kim et al. | |
| 2012/0162733 A1 | 6/2012 | Ferraro et al. | |
| 2013/0107336 A1 | 5/2013 | Wey et al. | |

FOREIGN PATENT DOCUMENTS

| | | |
|---|---|---|
| JP | 2005-181854 | 7/2005 |
| JP | 2010-139746 | 6/2010 |
| JP | 2012-008207 | 1/2012 |
| KR | 10-2009-0004931 | 1/2009 |
| KR | 10-2009-0018147 | 2/2009 |

(Continued)

*Primary Examiner* — Scott J Sugarman
*Assistant Examiner* — Sharrief Broome
(74) *Attorney, Agent, or Firm* — NSIP Law

(57) ABSTRACT

A method and apparatus for generating a hologram pattern using depth quantization may generate a hologram pattern corresponding to a three-dimensional (3D) object in a hologram plane using color image information of the 3D object and a point of the 3D object included in a quantized depth layer.

18 Claims, 9 Drawing Sheets

(56) References Cited

FOREIGN PATENT DOCUMENTS

| | | |
|---|---|---|
| KR | 10-2009-0088047 | 8/2009 |
| KR | 10-2010-0017838 | 2/2010 |
| KR | 10-2011-0127981 | 11/2011 |
| KR | 10-2012-0045269 | 5/2012 |
| KR | 10-2012-0054790 | 5/2012 |
| KR | 10-2012-0054799 | 5/2012 |
| KR | 10-2012-0066120 | 6/2012 |
| KR | 10-2013-0046535 | 5/2013 |
| KR | 10-2014-0067296 | 6/2014 |

\* cited by examiner

APPARATUS AND METHOD FOR GENERATING HOLOGRAM PATTERN

CROSS-REFERENCE TO RELATED APPLICATIONS

This application claims the priority benefit of Korean Patent Application No. 10-2013-0040822, filed on Apr. 15, 2013, in the Korean Intellectual Property Office, the disclosure of which is incorporated herein by reference.

BACKGROUND

1. Field

The following description relates to a method and apparatus for generating a hologram pattern using a depth image in the generation of the hologram pattern.

2. Description of the Related Art

With the advancement of digital media equipment and image processing technologies, image resolution and quality has improved. Also, the emergence of three-dimensional (3D) TVs allows for a stereoscopic image viewing experience at home. However, a type of image reflecting view information such as a single-view two-dimensional (2D) image or a 2-view stereo 3D image has a limitation in providing a realistic sense.

For example, a stereo 3D image does not reflect a motion parallax resulting from a motion of a viewer. In a case of a multi-view 3D image, for example, 2-view or greater, there is an optimum viewing zone in which a realistic representation of a depth value is allowed, implying that, in turn, a realistic representation of a depth value is not supported outside the optimum viewing zone.

A hologram provides an accurate representation of a 3D object using intensity and phase information of light and an unlimited number of viewpoints and thus, is acclaimed as a natural 3D space representation technique.

SUMMARY

The foregoing and/or other aspects are achieved by providing an apparatus for generating a hologram pattern, the apparatus comprising a depth quantizer to quantize a depth layer of a depth image based on depth image information of a three-dimensional (3D) object, and a hologram pattern generator to generate a hologram pattern corresponding to the 3D object in a hologram plane using color image information of the 3D object and a point of the 3D object included in the quantized depth layer.

The depth quantizer may quantize depth layers included in the depth image using a uniform quantization level.

The depth quantizer may quantize depth layers included in the depth image by quantizing depth samples transformed to a bit depth using a quantization level in which a same number of samples are present when a depth value of a pixel of the depth image is transformed to the bit depth.

The depth quantizer may quantize the depth layers included in the depth image by determining a depth value of a sample having a smallest depth value among samples of the quantization level to be an index of the quantization level.

The depth quantizer may quantize depth layers included in the depth image using a non-uniform quantization level.

The depth quantizer may quantize depth layers included in the depth image by quantizing depth samples transformed to a bit depth using a quantization level in which different numbers of samples are present when a depth value of a pixel of the depth image is transformed to the bit depth.

The depth quantizer may quantize the depth layers included in the depth image by determining a depth value of a sample having a smallest depth value among samples of the quantization level to be an index of the quantization level.

The depth quantizer may group a smaller number of samples as samples of the quantization level as a distance between points of the 3D object decreases, and may group a larger number of samples as the samples of the quantization level as the distance between the points of the 3D object increases.

The depth quantizer may include a look up table to match a depth value of a pixel of the depth image to a depth value converted from the depth value of the pixel through the quantization, and a converter to convert the depth value of the pixel of the depth image using the look up table.

The apparatus may further include an identifier to identify a quantized depth layer having a number of points of the 3D object in the quantized depth layer less than or equal to a threshold value among quantized depth layers, and a merger to merge the quantized depth layer having the number of points of the 3D object less than or equal to the threshold value in an adjacent depth layer.

The hologram pattern generator may generate the hologram pattern by duplicating a portion of the hologram pattern corresponding to the point.

The foregoing and/or other aspects are achieved by providing a method of generating a hologram pattern, the method including quantizing a depth layer of a depth image based on depth image information of a 3D object, and generating a hologram pattern corresponding to the 3D object in a hologram plane using color image information of the 3D object and a point of the 3D object included in the quantized depth layer.

The quantizing may include quantizing depth layers included in the depth image using a uniform quantization level.

The quantizing may include quantizing depth layers included in the depth image by quantizing depth samples transformed to a bit depth using a quantization level in which a same number of samples are present when a depth value of a pixel of the depth image is transformed to the bit depth.

The quantizing may include quantizing depth layers included in the depth image using a non-uniform quantization level.

The quantizing may include quantizing depth layers included in the depth image by quantizing depth samples transformed to a bit depth using a quantization level in which different numbers of samples are present when a depth value of a pixel of the depth image is transformed to the bit depth.

The quantizing may include grouping a smaller number of samples as samples of the quantization level as a distance between points of the 3D object decreases, and grouping a larger number of samples as the samples of the quantization level as the distance between the points of the 3D object increases.

The method may further include identifying a quantized depth layer having a number of points of the 3D object in the quantized depth layer less than or equal to a threshold value among quantized depth layers, and merging the quantized depth layer having the number of points of the 3D object less than or equal to the threshold value in an adjacent depth layer.

The foregoing and/or other aspects are achieved by providing a method of generating a hologram pattern including a three-dimensional (3D) object, the method including quantizing depth layers of a depth image based on a distance from the three-dimensional (3D) object to a viewer, and generating a hologram pattern corresponding to the 3D object in a hologram plane using the quantized depth layers.

A number of quantized depth layers may be inversely proportional to the distance from the three-dimensional (3D) object to the viewer.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
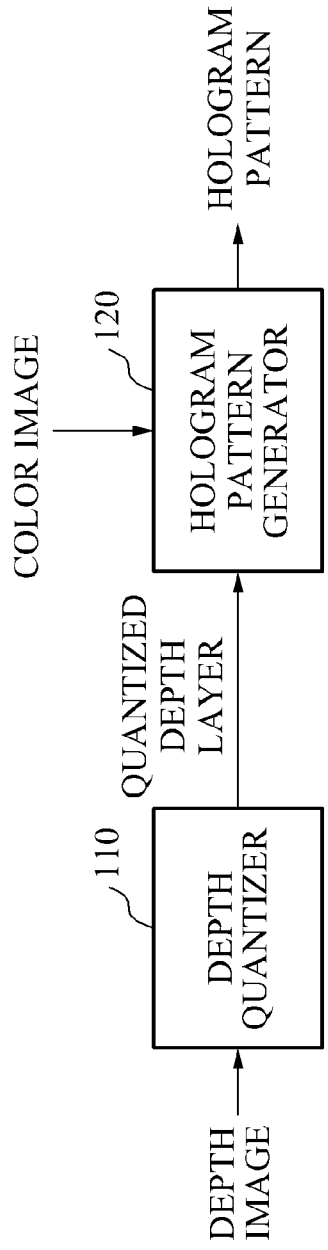
FIG. 1 illustrates an example of an apparatus for generating a hologram pattern.

Reference will now be made in detail to embodiments, examples of which are illustrated in the accompanying drawings, wherein like reference numerals refer to like elements throughout. Embodiments are described below to explain the present disclosure by referring to the figures.

In a method of generating a hologram, a method of digitally generating a hologram or a computer generated holography (CGH) involves modeling a three-dimensional (3D) object in a space and computing a hologram pattern.

A CGH or a technique of generating a hologram by a computer, introduced by Brown and Lohmann in 1966, is a technique of obtaining a hologram pattern or fringe pattern by approximation and mathematical computation of optical signals by an arithmetic unit. The CGH may generate a hologram pattern of a 3D object by defining the 3D object as a collection of spatial points, calculating a point hologram, for example, a Fresnel Zone Plate, for each point constituting the 3D object, and summing up the point holograms.

A number of points of a 3D object may determine an amount of computation or a computational complexity. As a number of points required for representing a 3D object increases, an amount of computation may increase and thus, generating a hologram in real time may be difficult.

A method of generating a hologram pattern may include a parallel processing calculation technique using hardware and a computation method through arithmetic approximation of a wave equation for pattern calculation.

FIG. 1 illustrates an example of an apparatus for generating a hologram pattern.

Referring to FIG. 1, the apparatus for generating a hologram pattern according to an exemplary embodiment may include a depth quantizer 110 and a hologram pattern generator 120.

The depth quantizer 110 may quantize a depth layer of a depth image based on depth image information of a 3D object. The depth image may include a plurality of depth layers. The depth image information may include depth values of points constituting the 3D object. The depth layer may be classified based on the depth values of the depth image. For example, when the depth image corresponds to an 8-bit image, the depth image may be classified into 256 samples having individual depth values. In this case, the depth image may include 256 depth layers.

For example, the depth quantizer 110 may quantize 256 depth layers to a smaller number of depth layers.

For example, the depth quantizer 110 may quantize all the depth layers included in the depth image using a uniform quantization level. The quantization level may be defined as a quantization width having a quantization value. The uniform quantization level may imply a uniform quantization width. For example, the quantization width may correspond to a number of samples to be quantized. The uniform quantization level may refer to a quantization level including the same number of samples. For example, the depth quantizer 110 may quantize 256 depth layers to 8 depth layers using 32 samples as a quantization level.

When a depth value of a pixel of the depth image is transformed to a bit depth, the depth quantizer 110 may quantize all the depth samples transformed to the bit depth using a quantization level in which a same number of samples are present. Here, all the depth samples may correspond to the depth values of the pixels of the depth image transformed to the bit depth. Also, an index may be calculated through quantization. For example, when the depth image is 8 bit, the depth image may be classified into a total of 256 depth samples. The depth quantizer 110 may calculate one index by quantizing 32 samples. By using 32 samples as a quantization level, the total of 256 depth samples may be quantized using 8 quantization levels, and as a result of the quantization, 8 quantized depth layers may be generated.

Among the samples of the quantization level, the depth quantizer 110 may determine a depth value of a sample having a smallest depth value among the samples of the quantization level to be an index of the quantization level. As an example, for each of the 8 quantized depth layers, the depth quantizer 110 may determine a depth value of a sample having a smallest depth value among the samples of the quantized depth layers to be a representative depth value.

As an example, the depth quantizer 110 may determine an average depth value of the samples of the quantization level to be an index of the quantization level.

As an example, the depth quantizer 110 may determine an intermediate depth value of the samples of the quantization level to be an index of the quantization level.

As an example, the depth quantizer 110 may determine a depth value of a sample having a greatest depth value among the samples of the quantization level to be an index of the quantization level.

For example, the depth quantizer 110 may quantize all the depth layers included in the depth image using a non-uniform quantization level. The non-uniform quantization level may imply that a quantization width differs based on a quantization level. For example, the quantization width may correspond to a number of samples to be quantized. The non-uniform quantization level may include different numbers of samples based on a quantization level.

When a depth value of a pixel of the depth image is transformed to a bit depth, the depth quantizer 110 may quantize all the depth samples transformed to the bit depth using a quantization level in which different numbers of samples are present. The depth quantizer 110 may calculate an index for each quantization level through quantization. For example, when the depth image is 8 bit, the depth image may be classified into a total of 256 depth samples. For example, the depth quantizer 110 may calculate 8 indices by quantizing 64 samples, 52 samples, 48 samples, 38 samples, 28 samples, 16 samples, 6 samples, and 4 samples from a smallest bit depth. Different number of samples may be used to form 8 quantization levels. The total of 256 depth samples may be quantized using 8 quantization levels, and 8 quantized depth layers may be generated.

The depth quantizer 110 may determine a depth value of a sample having a smallest depth value among the samples of the quantization level to be an index of the quantization level.

The depth quantizer 110 may reduce a number of samples to be grouped as a point of the 3D object becomes closer to a user, and may increase a number of samples to be grouped as the point of the 3D object becomes more distant from the user. The closer the point of the 3D object is to the user, the more accurately the 3D object may be identified. Here, the depth image may be classified at a shorter interval. In this case, a number of quantized depth layers may be increased by reducing a number of samples of a quantization level. In contrast, the farther away the point of the 3D object is from the user, the less accurately the 3D object may be identified by the user. Here, the depth image may be quantized at a wider interval. In this case, a number of quantized depth layers may be reduced by increasing a number of samples of a quantization level.

The hologram pattern generator 120 may generate a hologram pattern corresponding to the 3D object in a hologram plane using color image information of the 3D object and a point of the 3D object included in the quantized depth layer.

The hologram pattern generator 120 may generate a hologram pattern using a wave physics equation, or generate a hologram pattern using a hologram generation method based on a sub-hologram and radical symmetric interpolation (RSI).

For example, when a wave physics equation is used, the hologram pattern generator 120 may generate a hologram pattern $o_p(\xi, \eta)$ using Equation 1.

$$O_p(\xi, \eta) = \frac{a_p}{d_p}\exp\{j(kd_p + \phi_p)\}$$ [Equation 1]

Here, $a_p$ denotes an amplitude of a hologram pattern, $\phi_p$ denotes a phase of the hologram pattern, and k denotes a wave number of a reference wave. In this instance, k may be defined as $2\pi/\lambda$. Also, $\lambda$ denotes a wavelength of light in a space, and $d_p$ denotes a distance between a point p of the 3D object and a point $(\xi, \eta)$ in the hologram plane. In this instance, $d_p$ may be defined by Equation 2.

$$d_p = \sqrt{(\xi-x_p)^2+(\eta-y_p)^2+z_p^2}$$ [Equation 2]

The hologram pattern generator 120 may generate a hologram pattern corresponding to the 3D object by applying Equation 1 to all the points included in the 3D object.

When a hologram generation method based on RSI is used, the hologram pattern generator 120 may generate a hologram pattern by duplicating a portion of a hologram pattern corresponding to a point.

More particularly, the hologram pattern generator 120 may calculate a hologram pattern corresponding to a partial area rather than all hologram patterns corresponding to a point. Subsequently, the hologram pattern generator 120 may duplicate the previously generated area, arrange the duplicates at different directions, and combine the hologram patterns. Accordingly, the hologram pattern corresponding to the point may be generated by calculating the hologram pattern of the partial area.

The method of generating a hologram pattern performed by the hologram pattern generator 120 using the method of generating a hologram based on RSI is described in detail with reference to FIG. 9.

Figure 2:
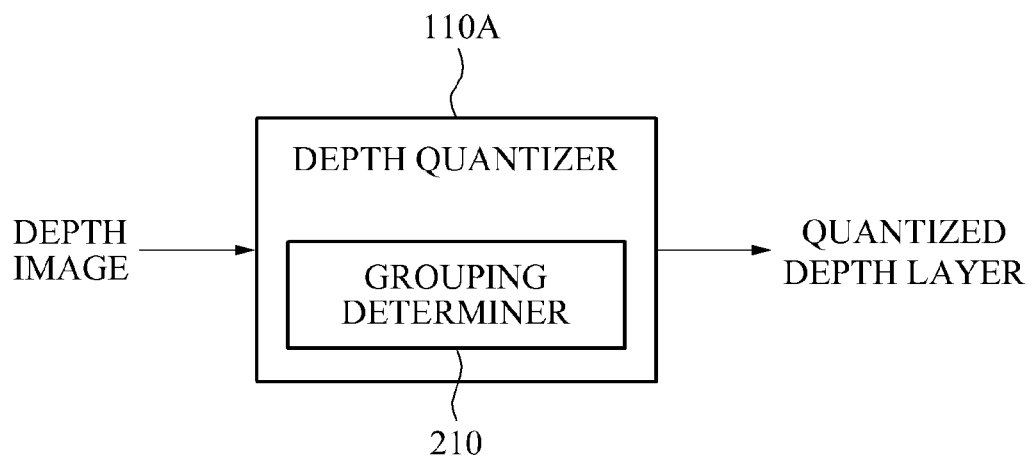
FIG. 2 illustrates an example of a depth quantizer.

FIG. 2 illustrates an example of a depth quantizer 110A.

Referring to FIG. 2, the depth quantizer 110A may quantize a depth layer of a depth image based on depth image information of a 3D object. The depth image may include a plurality of depth layers. The depth image information may include depth values of points constituting the 3D object. The depth layer may be classified based on the depth values of the depth image. For example, when the depth image corresponds to an 8-bit image, the depth image may be classified into a total of 256 samples having depth values. In this case, the depth image may include 256 depth layers. For example, the depth quantizer 110A may quantize all the depth layers included in the depth image using a non-uniform quantization level. The non-uniform quantization level may imply that a quantization width differs based on a quantization level. For example, the quantization width may correspond to a number of samples to be quantized. The non-uniform quantization level may include different number of samples based on a quantization level.

The depth quantizer 110A may include a grouping determiner 210.

The grouping determiner 210 may group a smaller number of samples as samples of the quantization level as a distance between points of the 3D object decreases. The grouping determiner 210 may group a larger number of samples as samples of the quantization level as a distance between points of the 3D object increases.

For example, in a case of an 8-bit image, as a distance between the points of the 3D object decreases, a smaller number of samples may be grouped as a sample of the quantization level among a total of 256 depth samples classified based on the depth values. In contrast, as the distance between the points of the 3D object increases, a larger number of samples may be grouped as samples of the quantization level.

The depth quantizer 110A may determine a depth value of a sample having a smallest depth value in the quantization level to be an index of the quantization level. As an example, the depth quantizer 110 may determine an average depth value of the quantization level to be an index of the quantization level. As an example, the depth quantizer 110 may determine a depth value of a sample having a greatest depth value in the quantization level to be an index of the quantization level.

Figure 3:
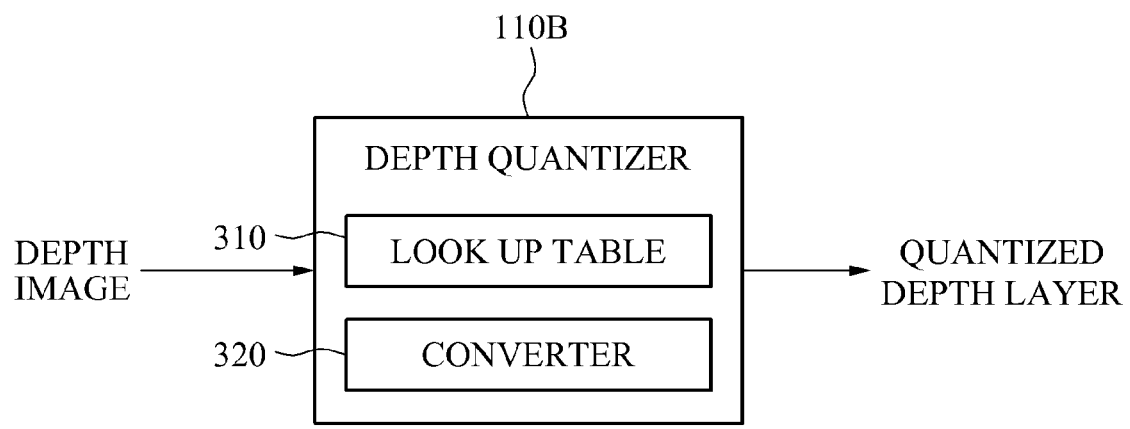
FIG. 3 illustrates an example of a depth quantizer.

FIG. 3 illustrates an example of a depth quantizer 110B.

Referring to FIG. 3, the depth quantizer 110B may quantize a depth layer of a depth image based on depth image information of a 3D object. The depth image may include a plurality of depth layers. The depth image information may include depth values of points constituting the 3D object. The depth layer may be classified based on the depth values of the depth image. For example, when the depth image corresponds to an 8-bit image, the depth image may be classified into 256 samples having depth values. In this case, the depth image may include 256 depth layers.

The depth quantizer 110B may include a look up table (LUT) 310 and a converter 320.

The look up table 310 may include matched information between depth values of pixels of the depth image and depth values converted from the depth values of the pixels through quantization.

During quantization, the depth quantizer 110B may pre-calculate a conversion table for a depth value of a pixel per pixel value, store the conversion table as the look up table 310, and convert a depth value for each pixel using the look up table 310. For example, depth values of each of 256 depth layers may be matched to converted depth values through quantization, and stored in the look up table 310.

The converter 320 may convert the depth values of the pixels of the depth image using the look up table 310.

Figure 4:
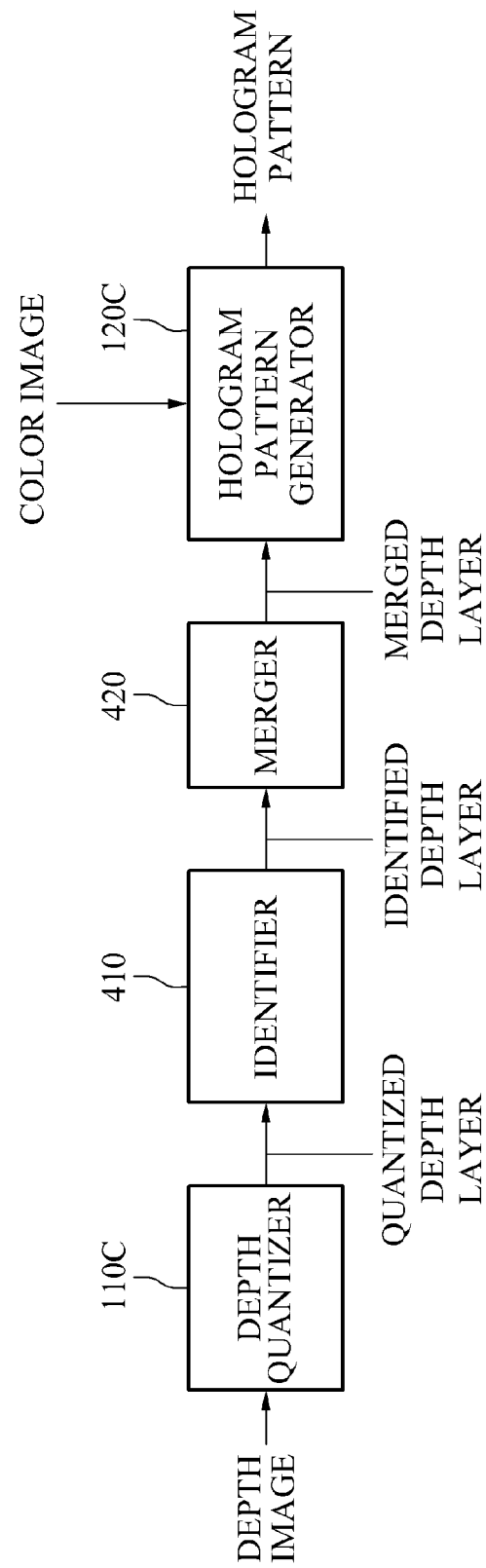
FIG. 4 illustrates an example of an apparatus for generating a hologram pattern.

FIG. 4 illustrates an example of an apparatus for generating a hologram pattern.

Referring to FIG. 4, an apparatus for generating a hologram pattern according to an exemplary embodiment may include a depth quantizer 110C, an identifier 410, a merger 420, and a hologram pattern generator 120C.

The depth quantizer 110C may quantize a depth layer of a depth image based on depth image information of a 3D object. The depth image may include a plurality of depth layers. The depth image information may include depth values of points constituting the 3D object. The depth layer may be classified based on the depth values of the depth image.

The identifier 410 may identify a quantized depth layer having a number of points of the 3D object included in the quantized depth layer less than or equal to a threshold value among quantized depth layers. The threshold value may be determined by an operation processing capability of a system. When a small number of points is included in the quantized depth layer, calculation may be simplified and as a result, an amount of computation and computational complexity of the system may be reduced.

The merger 420 may merge the quantized depth layer having the number of the points of the 3D object less than or equal to the threshold value in an adjacent quantized depth layer. The merger 420 may merge the depth layer identified by the identifier 410 in the adjacent quantized depth layer. As a result of the merge performed by the merger 420, a depth value of the quantized depth layer having the number of the points of the 3D object less than or equal to the threshold value may be merged in a depth value of the adjacent quantized depth layer.

The hologram pattern generator 120C may generate a hologram pattern corresponding to the 3D object in a hologram plane using color image information of the 3D object and a point of the 3D object included in the merged depth layer.

Figure 5:
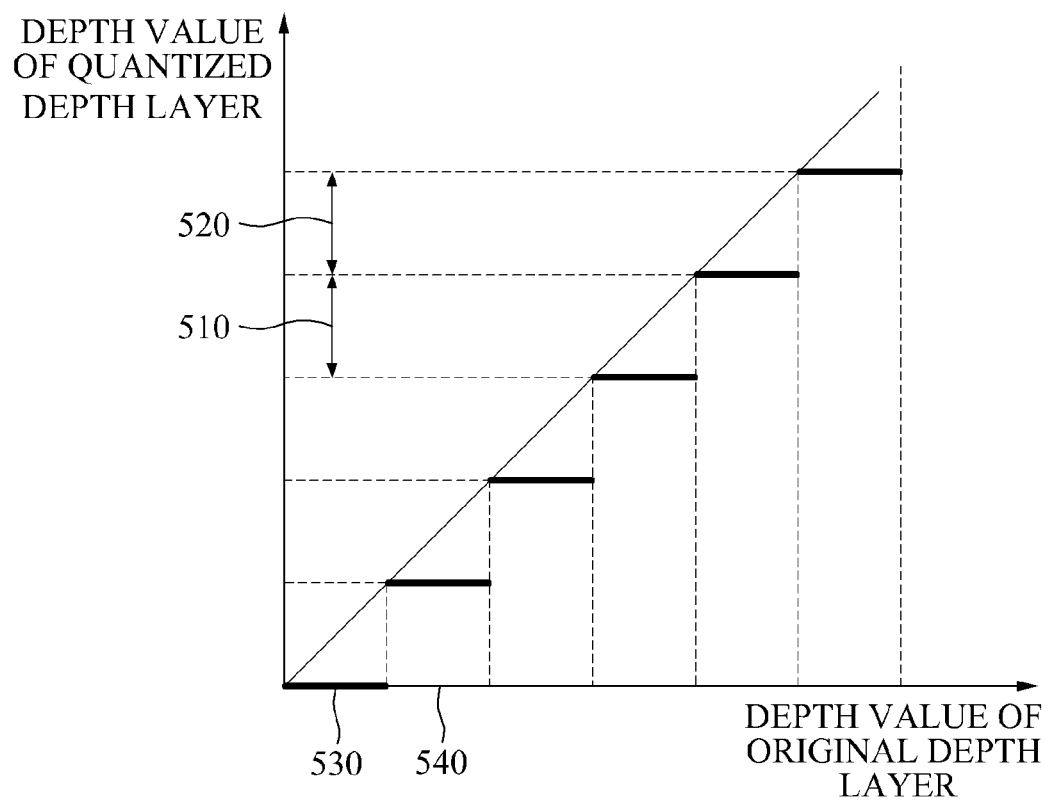
FIG. 5 illustrates an example of quantizing a depth layer using a uniform quantization level in an apparatus for generating a hologram pattern according to an example embodiment.

FIG. 5 illustrates an example of quantizing a depth layer using a uniform quantization level in an apparatus for generating a hologram pattern according to an exemplary embodiment.

Referring to FIG. 5, depth layers of a depth image may be quantized using uniform quantization widths 510 and 520. By using depth values of original depth layers as samples, when the original depth layers are quantized using quantization levels in which a same number of samples are present, a difference between the depth values of the quantized depth layers may be quantized using the uniform quantization widths 510 and 520.

In the example of FIG. 5, the original depth layers may be quantized to 6 quantized depth layers having a uniform quantization width.

The samples of uniform quantization widths 530 and 540 may be grouped and quantized. As shown in FIG. 5, a depth value of a sample having a smallest depth value among the grouped samples may be determined to be an index of the quantized depth layer. The example of FIG. 5 is just an example for illustration, and the index of the quantized depth layer is not limited to the example of FIG. 5.

Figure 6:
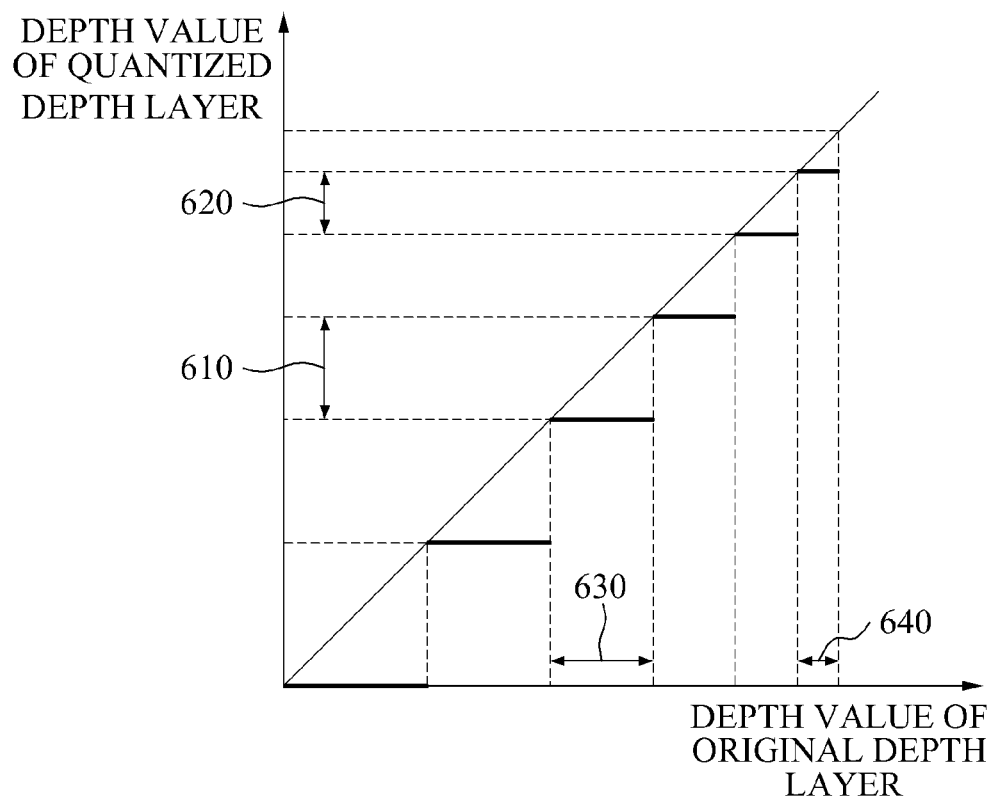
FIG. 6 illustrates an example of quantizing a depth layer using a non-uniform quantization level in an apparatus for generating a hologram pattern according to an example embodiment.

FIG. 6 illustrates an example of quantizing a depth layer using a non-uniform quantization level in an apparatus for generating a hologram pattern according to an exemplary embodiment.

Referring to FIG. 6, depth layers of a depth image may be quantized using non-uniform quantization widths 610 and 620. By using depth values of original depth layers as samples, when the original depth layers may be quantized using quantization levels in which different numbers of samples are present, a difference between the depth values of the quantized depth layers may be quantized using the different quantization widths 610 and 620.

In the example of FIG. 6, the original depth layers may be quantized to 6 quantized depth layers having a non-uniform quantization width.

The samples of non-uniform quantization widths 630 and 640 may be grouped and may be quantized. As shown in FIG. 6, a depth value of a sample having a smallest depth value among the grouped samples may be determined to be an index of the quantized depth layer. The example of FIG. 6 is just an example for illustration, and the index of the quantized depth layer is not limited to the example of FIG. 6.

Figure 7A:
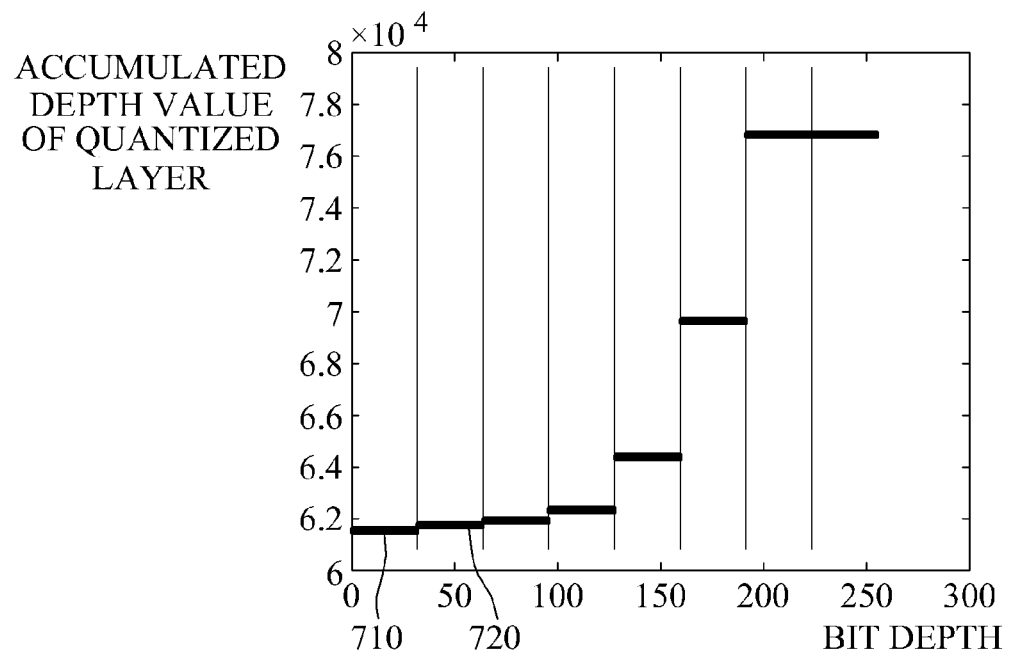
FIGS. 7A and 7B illustrate an example of quantizing a depth layer based on a bit depth in an apparatus for generating a hologram pattern according to an example embodiment.
Figure 7B:
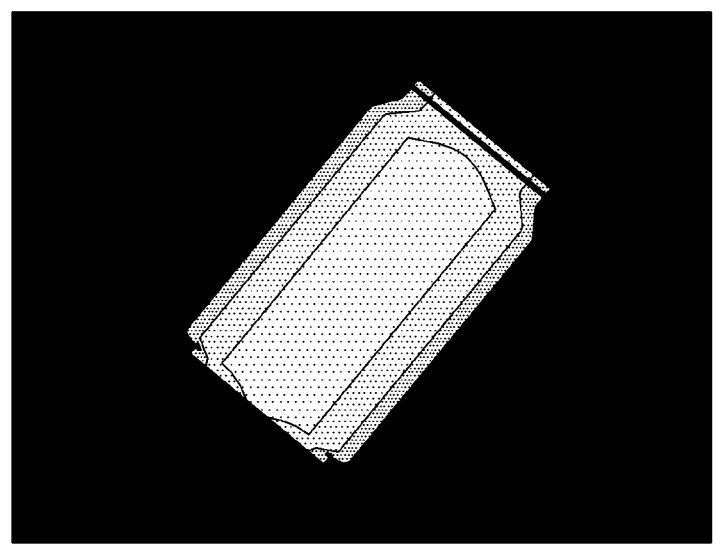

FIGS. 7A and 7B illustrate an example of quantizing a depth layer based on a bit depth in an apparatus for generating a hologram pattern according to an exemplary embodiment.

Referring to FIG. 7A, an accumulated depth value of a quantized depth layer may be indicated based on a bit depth of a pixel. For example, an 8-bit depth image may be classified into a total of 256 depth samples, and when the total of 256 depth samples are indicated using 8 identical quantization levels, each of the 8 quantization levels may be indicated by one index, by quantizing the samples using 256/8=32, for example, 0~31, 32~63, and the like.

A quantized depth layer 710 may be generated by quantizing samples 0~31, and a quantized depth layer 720 may be generated by quantizing samples 32~63. The depth image may be quantized to 8 quantized depth layers by quantizing 32 samples.

Referring to FIG. 7B, a histogram reflecting the accumulated depth value of the quantized depth layer of FIG. 7A is illustrated.

Figure 8A:
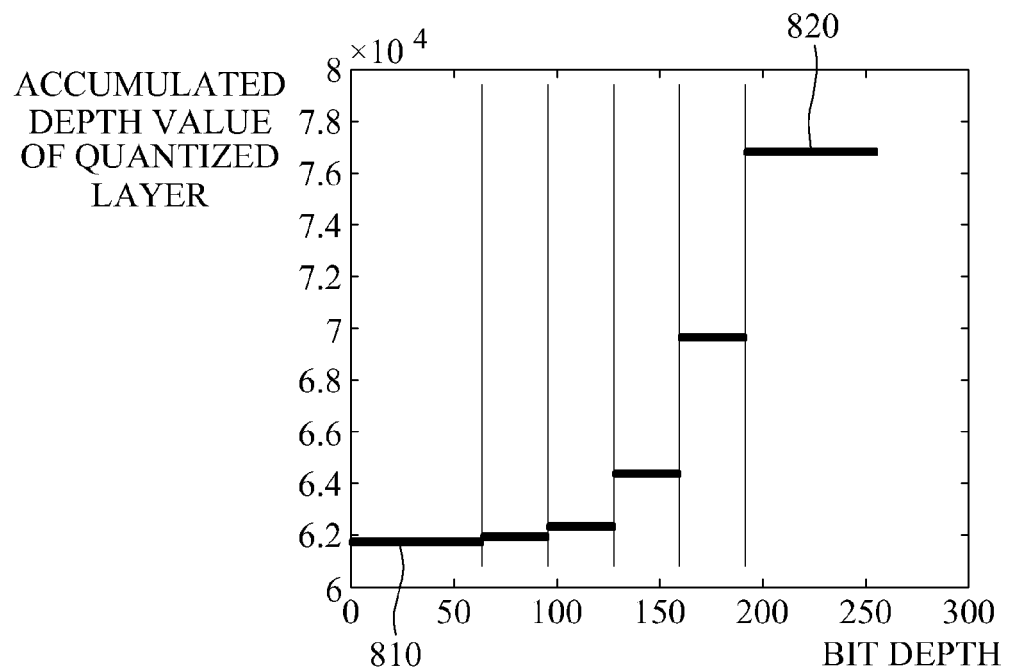
FIGS. 8A and 8B illustrate an example of post-processing a quantized depth layer in an apparatus for generating a hologram pattern according to an example embodiment.
Figure 8B:
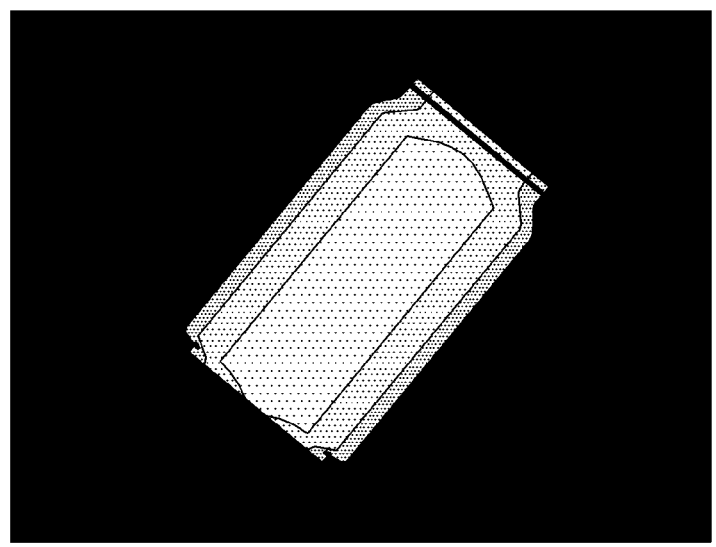

FIGS. 8A and 8B illustrate an example of post-processing a quantized depth layer in an apparatus for generating a hologram pattern according to an exemplary embodiment.

Referring to FIG. 8A, when a number of points included in the quantized depth layer 720 of FIG. 7 among the points of the 3D object is less than or equal to a preset threshold value, the depth values of the points included in the quantized depth layer 720 may be merged in the depth values of the quantized depth layer 710.

As a result of the merge being performed, a merged depth layer 810 may be post-processed to have a same depth value. A merged depth layer 820 may be post-processed to have a same depth value. When merging, a merged depth layer 810 or a merged depth layer 820 may be merged in an adjacent depth layer having a small depth value among adjacent depth layers. As an example, a merged depth layer 810 or a merged depth layer 820 may be merged in an adjacent depth layer having a great depth value among adjacent depth layers.

When quantization is only performed based on a bit depth, similar depth ranges may be merged in a same depth layer, resulting in improved efficiency. When a number of points is small but a range of depth values is very wide and thus, a number of depth layers is large, a number of depth layers having a small number of points may be increased. Accordingly, when a number of points is less than or equal to a threshold value through post-processing, a corresponding depth layer may be merged in an adjacent depth layer to reduce a number of depth layers required for calculation.

Referring to FIG. 8B, a histogram reflecting the accumulated depth value of the post-processed depth layer of FIG. 8A is illustrated.

Figure 9:
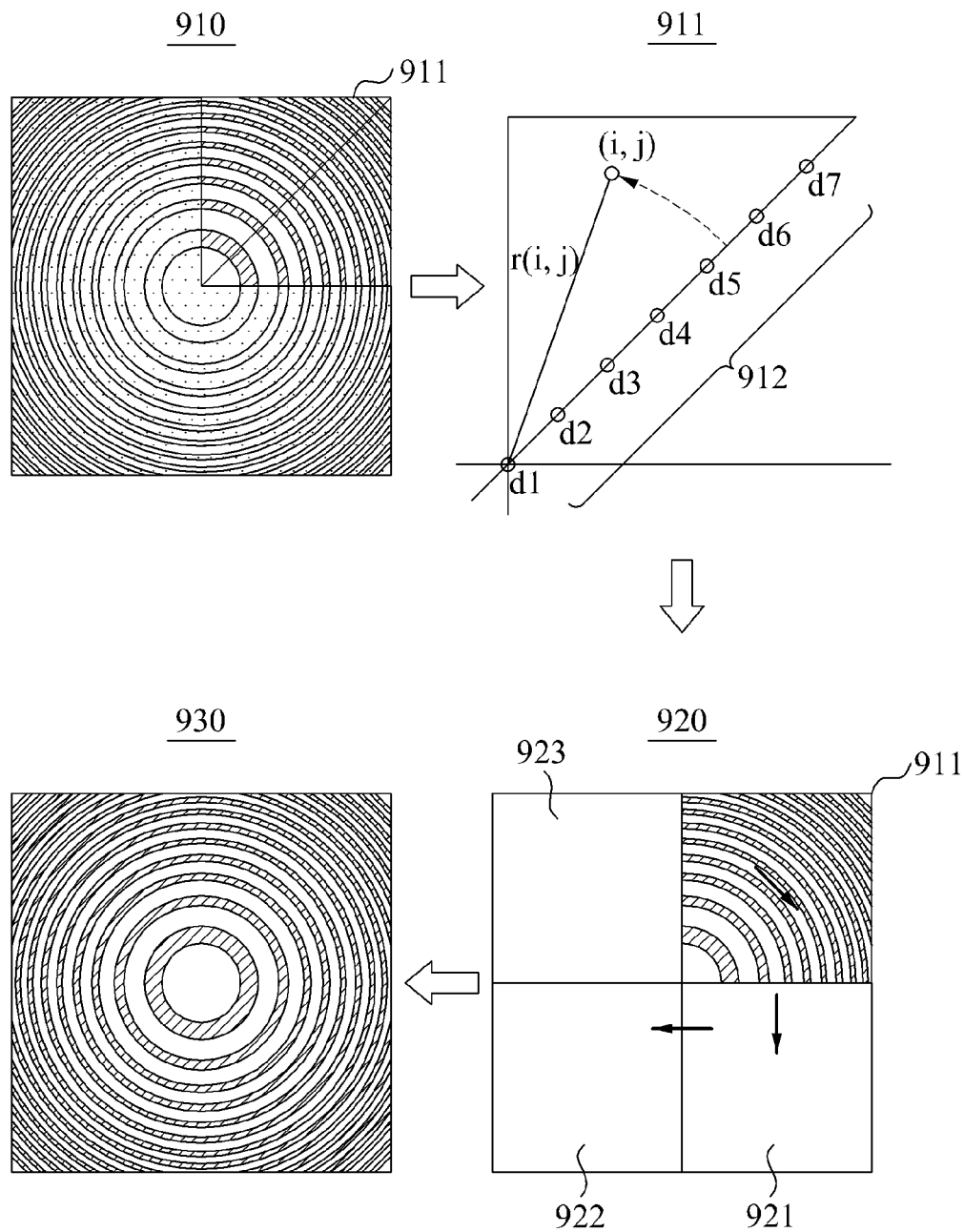
FIG. 9 illustrates an example of generating a hologram pattern in an apparatus for generating a hologram pattern according to an example embodiment.

FIG. 9 illustrates an example of generating a hologram pattern in an apparatus for generating a hologram pattern according to an exemplary embodiment.

Referring to FIG. 9, in operation 910, the hologram pattern generator 120 of FIG. 1 may set an area 911 in which a hologram is to be first formed.

The hologram pattern generator 120 may generate a hologram pattern corresponding to the area 911. For example, the first hologram pattern generator 120 may calculate points 912 representing thicknesses of concentric circles, and may rotate the calculated points to generate a hologram pattern corresponding to the area 911, as shown in FIG. 9.

In operation 920, the hologram pattern generator 120 may duplicate the area 911 of the hologram pattern generated in operation 910.

More particularly, the hologram pattern generator 120 may duplicate the area 911, and rotate the duplicated area 270 degrees to generate a hologram pattern corresponding to an area 921. Also, the hologram pattern generator 120 may duplicate the area 911, and rotate the duplicated area 180 degrees to generate a hologram pattern corresponding to an area 922.

Also, the hologram pattern generator 120 may duplicate the area 911, and rotate the duplicated area 90 degrees to generate a hologram pattern corresponding to an area 923.

In operation 930, the hologram pattern generator 120 may generate a hologram pattern by combining the areas generated in operation 920. More particularly, the hologram pattern generator 120 may generate a hologram pattern by combining the area 911, the area 921, the area 922, and the area 923.

Figure 10:
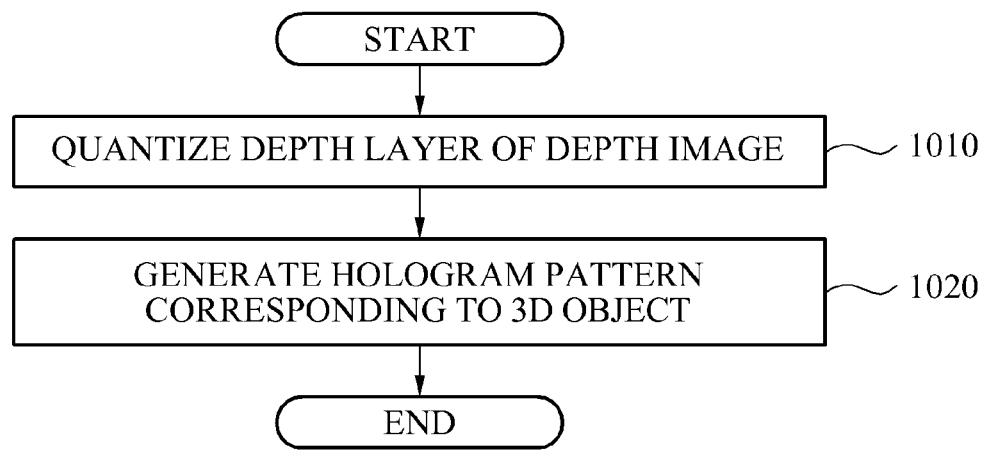
FIG. 10 is a flowchart illustrating a method of generating a hologram pattern according to an example embodiment.

FIG. 10 is a flowchart illustrating a method of generating a hologram pattern according to an example embodiment.

Referring to FIG. 10, in operation 1010, the apparatus for generating a hologram pattern according to an exemplary embodiment may quantize a depth layer of a depth image based on depth image information of a 3D object.

The apparatus for generating a hologram pattern according to an exemplary embodiment may quantize all the depth layers included in the depth image using a uniform quantization level.

When a depth value of a pixel of the depth image is transformed to a bit depth, the apparatus for generating a hologram pattern according to an exemplary embodiment may quantize all the depth samples transformed to the bit depth using a quantization level in which a same number of samples are present. Here, all the depth samples may correspond to the depth values of the pixels of the depth image transformed to the bit depth. Also, an index may be calculated through quantization.

The apparatus for generating a hologram pattern according to an exemplary embodiment may quantize all the depth layers included in the depth image using a non-uniform quantization level.

When the depth value of the pixel of the depth image is transformed to a bit depth, the apparatus for generating a hologram pattern according to an exemplary embodiment may quantize all the depth layers transformed into the bit depth using a quantization level in which different numbers of samples are present. The apparatus for generating a hologram pattern according to an exemplary embodiment may calculate an index for each quantization level through quantization.

The apparatus for generating a hologram pattern according to an exemplary embodiment may group a smaller number of samples as a distance between points of the 3D object decreases. The apparatus for generating a hologram pattern according to an exemplary embodiment may group a larger number of samples as the distance between the points of the 3D object increases.

The apparatus for generating a hologram pattern according to an exemplary embodiment may identify a quantized depth layer having a number of points of the 3D object included in the quantized depth layer less than or equal to a threshold value among quantized depth layers, and merge the quantized depth layer having the number of the points of the 3D object less than or equal to the threshold value in an adjacent quantized depth layer.

In operation 1020, the apparatus for generating a hologram pattern according to an exemplary embodiment may generate a hologram pattern corresponding to the 3D object in a hologram plane using color image information of the 3D object and a point of the 3D object included in the quantized depth layer.

The apparatus for generating a hologram pattern according to an exemplary embodiment may generate a hologram pattern with a realistic sense of depth of the 3D object and a minimum number of depth layers by optimizing a number of depth layers of the depth image representing the point of the 3D object.

The apparatus for generating a hologram pattern according to an exemplary embodiment may generate a hologram pattern in real time in the implementation of 3D display for hologram presentation using a processing device, for example, a digital signal processor (DSP), a central processing unit (CPU), and a graphics processing unit (GPU).

The methods according to the above-described embodiments may be recorded in non-transitory computer-readable media including program instructions to implement various operations by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for generating a hologram pattern, the apparatus comprising:
   a processor configured to quantize depth layers of a depth image based on depth image information of a three-dimensional (3D) object,
   identify a quantized depth layer having a number of points of 3D object in the quantized depth layer less than or equal to a threshold value among the quantized depth layers,
   merge the identified quantized depth layer having the number of points of the 3D object less than or equal to the threshold value with an adjacent depth layer, and
   generate a hologram pattern corresponding to the 3D object in a hologram plane using color image information of the 3D object and a point of the 3D object included in the quantized depth layers.

2. The apparatus of claim 1, wherein the processor quantizes the depth layers included in the depth image using a uniform quantization level.

3. The apparatus of claim 1, wherein the processor quantizes the depth layers included in the depth image by quantizing depth samples transformed to a bit depth using a quantization level in which a same number of samples are present when a depth value of a pixel of the depth image is transformed to the bit depth.

4. The apparatus of claim 3, wherein the processor quantizes the depth layers included in the depth image by determining a depth value of a sample having a smallest depth value among samples of the quantization level to be an index of the quantization level.

5. The apparatus of claim 1, wherein the processor quantizes the depth layers included in the depth image using a non-uniform quantization level.

6. The apparatus of claim 1, wherein the processor quantizes the depth layers included in the depth image by quantizing depth samples transformed to a bit depth using a quantization level in which different numbers of samples are present when a depth value of a pixel of the depth image is transformed to the bit depth.

7. The apparatus of claim 6, wherein the processor quantizes the depth layers included in the depth image by determining a depth value of a sample having a smallest depth value among samples of the quantization level to be an index of the quantization level.

8. The apparatus of claim 6, wherein the processor groups a smaller number of samples as samples of the quantization level as a distance between points of the 3D object decreases, and groups a larger number of samples as the samples of the quantization level as the distance between the points of the 3D object increases.

9. The apparatus of claim 1, wherein the processor comprises:
   a look up table to match a depth value of a pixel of the depth image to a depth value converted from the depth value of the pixel through the quantization; and
   a converter to convert the depth value of the pixel of the depth image using the look up table.

10. The apparatus of claim 1, wherein the processor generates the hologram pattern by duplicating a portion of the hologram pattern corresponding to the point.

11. A method of generating a hologram pattern, the method comprising:
    quantizing depth layers of a depth image based on depth image information of a three-dimensional (3D) object;
    identifying a quantized depth layer having a number of points of the 3D object in the quantized depth layers less than or equal to a threshold value among quantized depth layers;
    merging the identified quantized depth layer having the number of points of the 3D object less than or equal to the threshold value with an adjacent depth layer, and
    generating a hologram pattern corresponding to the 3D object in a hologram plane using color image information of the 3D object and a point of the 3D object included in the quantized depth layers.

12. The method of claim 11, wherein the quantizing comprises quantizing the depth layers included in the depth image using a uniform quantization level.

13. The method of claim 11, wherein the quantizing comprises quantizing the depth layers included in the depth image by quantizing depth samples transformed to a bit depth using a quantization level in which a same number of samples are present when a depth value of a pixel of the depth image is transformed to the bit depth.

14. The method of claim 11, wherein the quantizing comprises quantizing the depth layers included in the depth image using a non-uniform quantization level.

15. The method of claim 11, wherein the quantizing comprises quantizing the depth layers included in the depth image by quantizing depth samples transformed to a bit depth using a quantization level in which different numbers of samples are present when a depth value of a pixel of the depth image is transformed to the bit depth.

16. The method of claim 15, wherein the quantizing comprises grouping a smaller number of samples as samples of the quantization level as a distance between points of the 3D object decreases, and grouping a larger number of samples as the samples of the quantization level as the distance between the points of the 3D object increases.

17. A method of generating a hologram pattern comprising a three-dimensional (3D) object, the method comprising:
quantizing depth layers of a depth image based on a distance from the three-dimensional (3D) object to a viewer;
identifying a quantized depth layer having a number of points of the 3D object in the quantized depth layers less than equal to a threshold value among quantized depth layers;
merging the identified quantized depth layer having the number of points of the 3D object less than or equal to the threshold value with an adjacent depth layer, and
generating a hologram pattern corresponding to the 3D object in a hologram plane using the quantized depth values.

18. The method of claim 17, wherein a number of quantized depth layers of the quantized depth values is inversely proportional to the distance from the three-dimensional (3 D) object to the viewer.

* * * * *